United States Patent [19]

Leiby

[11] Patent Number: 4,502,620

[45] Date of Patent: Mar. 5, 1985

[54] METHOD AND MEANS FOR SEVERING AN OPTICAL FIBER

[75] Inventor: John J. Leiby, Reading, Pa.

[73] Assignee: TRW Inc., Redondo Beach, Calif.

[21] Appl. No.: 524,753

[22] Filed: Aug. 19, 1983

[51] Int. Cl.³ ............................................ C03B 37/16
[52] U.S. Cl. ............................................ 225/2; 225/96; 225/101; 225/106
[58] Field of Search ................ 225/2, 96, 101, 106; 65/10.2

[56] References Cited

U.S. PATENT DOCUMENTS

| | | | |
|---|---|---|---|
| 3,934,773 | 1/1976 | Chinnock et al. | 225/2 |
| 3,981,422 | 9/1976 | Moore | 225/2 |
| 4,017,013 | 4/1977 | Hawk et al. | 225/96.5 |
| 4,036,419 | 7/1977 | Hensel et al. | 225/96.5 |
| 4,202,475 | 5/1980 | Hirai et al. | 225/2 |
| 4,274,572 | 6/1981 | Dunn et al. | 225/96.5 |
| 4,322,025 | 3/1982 | Johnson | 225/96.5 |

OTHER PUBLICATIONS

Optical Fiber End Preparation for Low-Loss Splices, D. Gloge, P. W. Smith, D. L. Bisbee, E. L. Chinnock, The Bell System Technical Journal, vol. 52, No. 9, Nov., 1973, pp. 1579-1588.

Simplified Optical-Fibre Breaking Machine, P. Hensel, Electronics Letters, Nov. 27th, 1975, vol. II, No. 24.

Fibers Simple Testing Methods Give Users a Feel for Cable Parameters, R. B. Chester, F. W. Dabby, Electronics, Aug. 5, 1976, pp. 90-92.

Fiber-Break Testing by Interferometry: A Comparison of Two Breaking Methods, K. S. Gordon, E. G. Rawson and A. B. Nafarrate, Applied Optics, Apr., 1977, vol. 16, No. 4, pp. 818-819.

Splice Losses in Step-Index Fibers: Dependency on Fiber-Break Angle, K. S. Gordon, E. G. Rawson and R. E. Norton, Applied Optics, Sep., 1977, vol. 16, No. 9, pp. 2372-2374.

Hand Held Tool to Cut and Prepare Fiber-Optic Waveguide Ends, E. Bossi, L. K. Schultz and C. A. Staples, IBM Technical Disclosure Bulletin, Sep., 1978, vol. 21, No. 4, pp. 1400-1401.

Optical Fiber Cutting Tool, B. C. Uberbacher, IBM Technical Disclosure Bulletin, May, 1979, vol. 21, No. 12, pp. 4947-4948.

Primary Examiner—Frank T. Yost
Attorney, Agent, or Firm—Jacob Trachtman

[57] ABSTRACT

The method comprises the steps of (a) inflicting a flaw on the glass surface of an optical glass fiber to be severed, (b) contacting an area about the fiber for applying pressure thereto which compresses the fiber, and (c) moving the contacted area along the fiber while applying sufficient pressure to produce frictional force which severs the fiber as the contacted area moves over the flaw. The means of the invention comprises scoring means for inflicting a flaw on the glass surface of an optical glass fiber to provide the fiber with first and second portions which are axially displaced to border the flaw on opposite sides, pressure means which slidably engages and compresses the fiber by applying pressure to a contacted area about the fiber, and displaceable means which applies tension force between the first portion of the fiber and the pressure means to move the fiber with respect to the pressure means so that its contacted area passes over the inflicted flaw on the glass surface as it moves along the fiber from its first portion to its second portion. The pressure means produces frictional force with the motion of the fiber at the contacted area along the surface of the fiber in a direction opposing the motion, which force increases on the second portion of the fiber until it is sufficient to sever the fiber at the inflicted flaw.

38 Claims, 6 Drawing Figures

METHOD AND MEANS FOR SEVERING AN OPTICAL FIBER

BACKGROUND OF THE INVENTION

The invention relates to a method and means for severing an optical fiber, and particularly to a method and means for providing an optical fiber with an end having a mirror smooth face normal to the axis of the fiber and suitable for mass production or use in the field.

Heretofore, methods and means have been provided for severing optical fibers to produce ends with mirror smooth surfaces for minimizing light transmission loss at interfaces. Such means and methods, however, have been complex and exacting, and have required that a flaw or defect be inflicted on the fiber as by scribing while tension is applied to the fiber and/or that different levels of tension be applied during the scribing and severing steps of the operation. Previous methods have also required that the fiber be scribed while it is positioned about a curved mandrel and tensioned to a predetermined extent by being secured at opposite sides of the score mark. Since such techniques require that the fiber be clamped on opposite sides of the inflicted defect to create the breaking stress, the lengths of fiber which can be produced having smooth square surfaces at both ends may not be as short as desired. Such techniques in addition to requiring extensive hardware can be inadvertent twisting of the fiber during fiber crack propogation, produce surface irregularities and fail to consistently provided good square breaks.

SUMMARY OF THE INVENTION

It is, therefore, a principal object of the invention to provide a new and improved method and means for severing an optical fiber which are simple in nature and may be easily carried out during the manufacturing process as well as in the field for producing a fiber having ends with mirror smooth surfaces normal to the axis of the fiber.

Another object of the invention is to provide a new and improved method and means for severing an optical fiber which do not require tensioning of the fiber during the inflicting of a flaw on the fiber.

Another object of the invention is to provide a new and improved method and means for severing an optical fiber to produce ends with mirror smooth surfaces without requiring that the fiber be tensioned between fixed clamps during the severing operation.

Another object of the invention is to provide a new and improved method and means for severing an optical fiber which are highly reliable and consistently provides severed fiber ends with mirror smooth surfaces.

Another object of the invention is to provide a new and improved method and means for severing an optical fiber which do not require the removal of the outer protective covering over the glass surface of the fiber for the severing operation.

Another object of the invention is to provide a new and improved method and means for severing an optical fiber which allow the production of fibers of very small length having ends with mirror smooth surfaces normal to the axis of the fiber.

The above as well as many other objects and advantages of the invention are achieved by the method of the invention which comprises the steps of (a) inflicting a flaw on the glass surface of an optical glass fiber to be severed, (b) contacting an area about the fiber for applying pressure thereto which compresses the fiber, and (c) moving the contacted area along the fiber while applying sufficient pressure to produce frictional force which severs the fiber as the contacted area moves over the flaw. The term "flaw" as used herein designates a condition on the outer glass surface of an optical glass fiber such as a scribe mark, crack, or other defect provided for originating a break in the fiber, and as known in the prior art and referred to in the article entitled Optical Fiber End Preparation for Low-Loss Splices by D. Gloge, P. W. Smith, D. L. Bisbee, and E. L. Chinock, published in The Bell System Technical Journal, Vol. 52, No. 9, November, 1973.

The apparatus of the invention comprises scoring means for inflicting a flaw such as a scribe mark on the glass surface of an optical glass fiber. The scribe mark divides the fiber into first and second axially displaced portions which border the flaw on opposite sides. Pressure means slidably engages and compresses the fiber by applying pressure to a contacted area about the fiber. Displaceable means applies tension force between the first portion of the fiber and the pressure means to move the fiber with respect to the pressure means so that its contacted area passes over the flaw as it moves along the surface of the fiber from its first portion to its second portion. With the motion of the fiber, the pressure means produces frictional force at the contacted area along the surface of the fiber in a direction opposing the motion. The frictional force applied to the first portion of the fiber decreases as the contacted area passes over the flaw, while the frictional force applied to the second portion correspondingly increases. The frictional force applied to the second portion of the fiber which is in opposition to the tension force applied to the first portion of the fiber, increases until it is sufficient to sever the fiber at the inflicted flaw.

In the embodiment disclosed, the pressure means comprises a pair of oppositely positioned resilient pad elements. The fiber is slidably received between the pad elements which apply compressive pressure to the contacted area about the fiber. The pressure means includes biasing means which urges the pad elements toward each other so that sufficient pressure is applied to the fiber by the pad elements to result in the severing of the fiber at the inflicted flaw. The displaceable means includes clamping means for being secured with the first portion of the fiber and guide means for moving the pad elements along the fiber in a direction away from the first portion and toward the second portion of the fiber, so that the contacted area moves over the flaw for severing the fiber. The fiber severing means also includes scoring means comprising blade means for engaging the outer glass surface of the fiber to inflict a flaw or lightly scribed mark which may be a line which is transverse to the longitudinally extending direction of the fiber.

BRIEF DESCRIPTION OF THE DRAWING

The foregoing and other objects of the invention will become more apparent as the following detailed description of the invention is read in conjunction with the drawing, in which:

FIG. 2 is a top plan view of FIG. 1, and FIGS. 3, 4, 5 and 6 are enlarged views schematically illustrating the method of the invention as a fiber with a

DETAILED DESCRIPTION OF THE INVENTION

Figure 1:
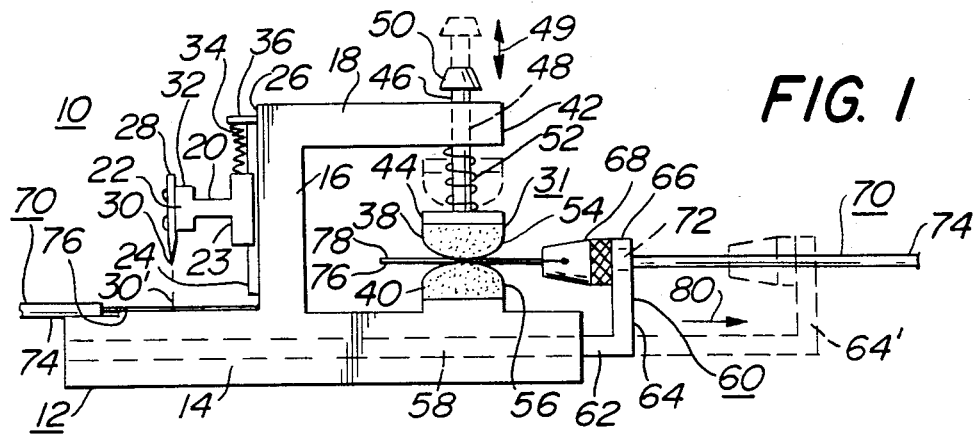
FIG. 1 is a front elevational view of a means 10 for severing an optical fiber embodying the invention.
Figure 2:
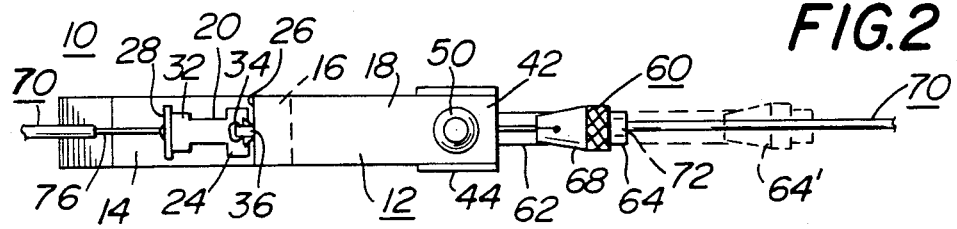

Referring to FIGS. 1 and 2, a means 10 for severing an optical glass fiber embodying the invention comprises a support member 12 having a horizontal base portion 14, and an upstanding intermediate portion 16. A portion 18 extends horizontally from the top of the portion 16 and overlies the base 14 of the support member 12. The body 20 of a scoring means 22 has an end 23 which slidably engages a track 24 mounted on a vertical surface 26 of the portion 16 of the support member 12. A blade 28 with its sharpened end 30 directed downwardly is secured at the free end 32 of the body 20 for movement therewith in a vertical direction. A coil spring 34 which extends along the track 24 above the body 20 has its bottom end secured with the end 23 of the body 20 and its top end attached at the top end 36 of the track 24 for urging the body 20 upwardly along the track 24.

A pressure means 31 comprises resilient upper and lower pad elements 38 and 40. The lower pad element 40 is secured on an upper surface of the base portion 14 of the support member 12 under the end 42 of the horizontal portion 18. The upper pad element 38 is movably retained over the pad element 40 by being secured with the bottom surface of a plate 44 which is attached to the bottom end of a vertical rod 46. The rod 46 is retained for vertical movement through an opening 48 in the end 42 of the support member 12 as shown by the arrows 49. The rod 46 has an enlarged top 50 positioned above the end 42 of the member 12, and is provided with a coil spring 52 thereabout extending between the plate 44 and the end 42 of the member 12. The spring 52 urges the rod 46 in a downward direction for moving the outer surface 54 of the pad elememt 38 into engagement with the outer surface 56 of the bottom pad element 40.

The base portion 14 of the support member 12 is provided with a horizontally extending opening 58 therethrough. A displaceable means 60 has an elongated horizontal portion 62 which is slidably received into the opening 58 of the base 14, and an upwardly extending end portion 64. The opening 58 and horizontal portion 62 of the displaceable means 60 received therein preferably are both provided with rectangular cross-sections for maintaining the end portion 64 in its upward orientation. The upper end 66 of the end portion 64 supports a clamp 68 for securing an optical fiber therewithin. The end portion 64 has an opening 72 which permits an optical fiber 70 to be positioned therethrough into the clamp 68 for being secured with the displaceable means 80.

In using the apparatus 10 for carrying out the method of the invention, an optical glass fiber 70 which is to be severed has a length of its outermost plastic cover 74 removed to uncover a region 76. However, the thin protective coating which may be provided over the glass surface of the fiber shielding the uncovered region 76 can be retained, if desired, for enhancing the strength of the fiber 70. The uncovered region 76 of the optical fiber 70 is positioned under the edge 30 of the blade 28 as illustrated, and the body 20 of the scoring means 22 is moved downwardly along the track 24 in opposition to the tension of the spring 34, until the blade edge 30 as shown at 30' strikes the uncovered region 76 and penetrates the protective coating to inflict a flaw on the glass surface of the optical fiber 70. The flaw may be in the form of a scribe mark 82 (FIG. 3) which may be a line transverse to the longitudinal extension or axis 97 of the optical fiber. Upon the release of the body 20 of the scoring means 22, the spring 34 moves it upwardly and away from the fiber 70, allowing the fiber 70 to be removed. The scribing of the fiber 70, thus, is accomplished in a simple and efficient manner without the need to placing the fiber under tension or subject it to any other conditions such as curving or stressing.

Figures 3, 4:
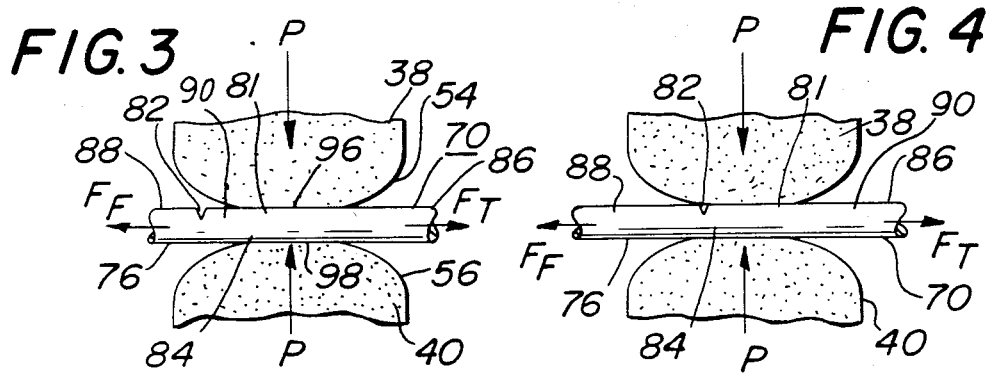

With the flaw or scribe mark 82 preferably facing upwardly, the fiber 70 is positioned so that its uncovered region 76 extends through the opening 72 and clamp 68 of the displaceable means 60. The end 50 of the rod 46 is lifted to allow the fiber 70 with its scribe mark 82 to pass between and beyond the pair of pads 38, 40. The end 50 of the rod 46 is then released to permit the pads 38 and 40 to approach each other and engage the uncovered portion 76 of the fiber 70 between the pad outer surfaces 54, 56, and the clamp 68 is engaged to secure the fiber therewithin. The spring 52 exerts pressure on the pads 38 and 40, so that they subject the contacted areas 81 of the fiber 70 therebetween to compressive force as shown in FIG. 3. To provide a mirror smooth end at the scribe mark 82 on the fiber 70, the displaceable means 60 is actuated in the direction indicated by the arrow 80 of FIG. 1 so that its horizontal portion 62 moves to the right out of the opening 58 of the base 14 as shown by the dashed lines at 64'. The fiber 70 retained by the clamp 68 is also displaced to the right, so that the scribe mark 82 moves between the pads 38 and 40, is subjected to pressure therebetween, and is severed at the scribe mark 82.

Refer to FIGS. 3 to 6 for a description in greater detail of the manner in which the method and apparatus severs the optical fiber 70 when the displaceable means 62 is moved from its retracted position shown by solid lines in FIGS. 1 and 2 to its extended position shown at 64' by the dashed lines. FIG. 3 illustrates the uncovered portion 76 of the optical fiber 70 positioned between lower and upper pads 38 and 40 with the scribe mark 82 facing upwardly and to the left and out of contact with the pads 38 and 40. The outer surfaces 54 and 56 of the pad elements 38 and 40, contact and envelope the optical fiber portion 76 within a region 81 therebetween. Since the relative size of the fiber 76 with respect to the pad elements 38 and 40 are exaggerated, the fiber 76 being much smaller in comparison, the resilient pad elements 38 and 40 contact and engage a substantial peripheral surface area 84 of the portion 76 of the fiber 70. The scribe mark 82 is also shown in exaggerated form for purpose of illustration.

With the movement of the displaceable means 62 to the right, a tension force $F_T$ is exerted on the forward end 86 of the fiber portion 76 as illustrated in FIG. 3. This results in the relative movement of the fiber portion 76 between the pad elements 38 and 40. Since a pressure P is exerted by the pad elements 38 and 40 on the contacted area 81 of the fiber in the region 84 therebetween, a frictional force $F_F$ is produced opposing the tension force $F_T$ as illustrated. As the fiber 76 moves to the right, the scribe mark 82 enters into the region 84 between the pads 38 and 40. Since the frictional force $F_F$ is produced within the region 84 by contact with the pad elements 38 and 40, a portion of the total frictional force $F_F$ is produced on a portion 88 of the fiber axially displaced to the left of the scribe mark 82, while the remaining frictional force is produced on the portion 90 axially displaced to the right of the scribe mark 82 within the contacted region 84.

Figures 5, 6:
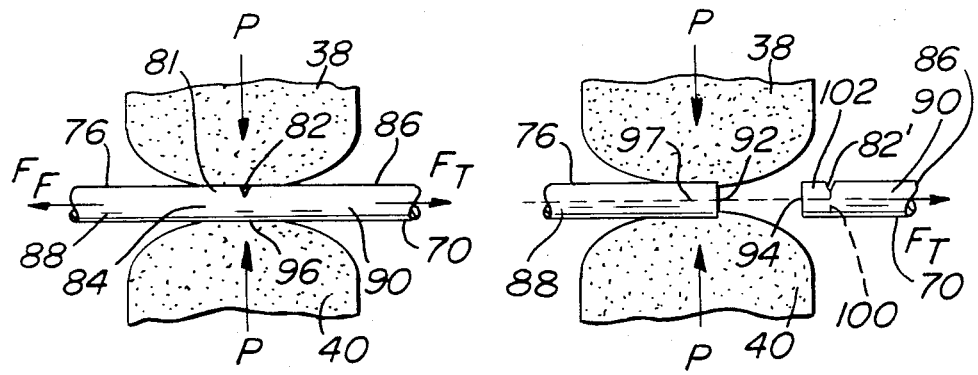

As shown in FIG. 5, the continued movement of the fiber portion 76 to the right results in the translation of the scribe mark 82 towards the center of the region 84 of the pads 38 and 40, so that the frictional force produced and exerted on the contacted portion 88 of the fiber 70 to the left of the scribe mark 82 is equal to the frictional force on the contacted portion 90 to the right of the scribe mark 82. As seen from the FIGS. 3 to 5, as the scribe mark 82 moves to the right through the contacted region 84, the pad elements 38 and 40 contact a larger portion 88 to the left of the scribe mark 82, producing increased frictional force thereon. As the frictional force on the portion 88 of the fiber 70 increases, it reaches a critical value resulting in crack propagation at the scribe mark 82, severing the fiber at the scribe mark 82 to produce end faces 92 and 94, respectively, on the portions 88 and 90 of the fiber 76 which are mirror surfaces normal to the axis 97 of the fiber 70 as illustrated in FIG. 6.

The method and apparatus of the invention, thus, does not require that the optical fiber be subjected to tension during scribing or that it be fixedly secured at opposite ends for tensioning to produce the severed ends with the desired optical properties. Since both ends need not be clamped or fixed, the optical fiber is not subjected to torsional or twisting stresses which could otherwise be present. Such twisting and misaligning is undesirable because it results in end surfaces which are distorted and/or not normal to the direction of the longitudinal axis 97 of the fiber 70. The process and apparatus of the invention provides opposing forces on opposite sides of the scribe mark 82 which gradually increase as the scribe mark 82 moves through the contacted region 84 between the pad elements 38 and 40 with the movement of the displaceable means 82. The forces which are, thus, applied for causing the severing of the fiber, need not be adjusted to any particular values since they increase until they cause the severing action, and are removed as the left and right portions 88 and 90 of the optical fiber are severed as shown in FIG. 6. The frictional force produced by the pressure applied to the fiber may be controlled by varying the contour of the resilient surfaces 54 and 56 of the pads 40 and 38. Thus, by providing the contacting surfaces 54 and 56 with a curved contour increased pressure and greater compression are provided at their center regions 96, 98. Since the frictional force applied to the fiber 70 varies within the contacted region 84 with the applied pressure being greatest at the center contact regions 96, 98, this results in a non linear increase of frictional force applied to the portion 88 of the fiber as the scribe mark 82 moves between the pad elements 38 and 40 toward the center regions 96, 98. Movement of the scribe mark 82 passed the center regions 96, 98, while continuing to increase the frictional force applied to the portion 88 for severing the fiber, provides a reduced rate of increase. By such contouring of the surfaces of the pad elements 38 and 40, the range of frictional forces applied, may be controlled and selected so that the apparatus may be effective for severing fibers of different diameters without adjustment of the force provided by the spring 52. If desired, the force of the spring 52 may also be adjusted by compressing it or by other known means, for controlling the force P exerted between the pad elements 38 and 40 and the resulting frictional forces.

For the purpose of producing extremely short length of optical fiber having a second mirror smooth end face 100 represented by the dashed line in FIG. 6, the portion 90 of the fiber 70 having the mirror end face 94 may be provided with a scribe mark 82' by use of the scoring means 22, and then subjected to the severing action of the pad elements 38 and 40 as just described. This will sever the portion 90 of the optical fiber 70 to provide the end face 100 shown by the dashed line and produce a very short portion 102 of optical fiber with mirror smooth ends 92 and 100. Of course, scribe marks 82' may be positioned at selected locations for providing optical fibers of any desired length, and by the process and techniques disclosed may provide fibers as short as 0.060 inch and perhaps shorter. This can be achieved by the invention, since only one end of optical fiber need be secured at a distal end 86 for severing the fiber and producing the mirror optical surfaces.

The method and apparatus of the invention operates with great reliability to consistently provide mirror smooth end surfaces normal to the fiber axis. The invention may be utilized in manufacturing and in the field and is so simple and effective that it can be carried out by hand by scribing a transverse line on the glass surface of the optical fiber to be severed, after which the optical fiber is drawn between two fingers of one hand while sufficient pressure is applied by the fingers to the fiber to produce the frictional force which severs the fiber as the contacted area moves over the scribed line. Although only one embodiment of the device for carrying out the method of the invention is described in detail, it is apparent that many other embodiments may also be utilized for providing the advantages of the invention.

It will thus be seen that the objects set forth above, among those made apparent from the preceding description, are efficiently attained and, since certain changes may be made in the above method and apparatus without departing from the scope of the invention, it is intended that all matter contained in the above description shall be interpreted as illustrative and not in a limiting sense.

What is claimed is:

1. A method of severing an optical fiber comprising the steps of (a) inflicting a flaw on the glass surface of an optical glass fiber to be severed, (b) contacting an area about the fiber for applying pressure thereto which compresses the fiber, and (c) moving the contacted area along the fiber while applying sufficient pressure to produce frictional force which severs the fiber as the contacted area moves over the flaw.

2. The method of claim 1 in which in step (b) the fiber is contacted by and pressure is applied thereto by a pad element.

3. The method of claim 1 in which in step (b) the fiber is contacted and pressure is applied thereto by being placed between a pair of oppositely positioned resilient pad elements.

4. The method of claim 3 in which in step (b) the pressure applied to the fiber is controlled by the application of force to the pad elements urging them toward each other.

5. The method of claim 3 in which the surface of at least one of the pad elements contacting the fiber is conditioned so that the pressure applied to the fiber by the pads produces frictional force which effectively increases for severing the fiber as the contacted area moves over the flaw.

6. The method of claim 1 in which in step (a) the flaw on the fiber is inflicted by blade means producing a defect on the glass surface of the fiber.

7. The method of claim 2 in which in step (b) the pad element is moved with respect to the fiber for moving the contacted area along the fiber over the flaw for severing the fiber.

8. The method of claim 3 in which in step (c) the fiber has a portion which is secured against movement and the pad elements are moved away from the fixed portion for moving the contacted area along the fiber over the flaw for severing the fiber.

9. The method of claim 8 in which in step (c) the fiber is moved with respect to the pad elements for continuously moving the contacted area of the fiber over the flaw for severing the fiber.

10. The method of claim 9 in which the pressure applied to the fiber is controlled by the application of force to the pad elements urging them toward each other.

11. In a method of severing an optical glass fiber which has a flaw inflicted on its glass surface the steps of (a) contacting an area about the fiber for applying pressure thereto which compresses the fiber, and (b) moving the contacted area along the fiber while applying sufficient pressure to produce frictional force which severs the fiber as the contacted area moves over the flaw.

12. The method of claim 11 in which in step (a) the fiber is contacted by and pressure is applied thereto by a pad element.

13. The method of claim 11 in which in step (a) the fiber is contacted and pressure is applied thereto by being placed between a pair of oppositely positioned pad elements.

14. The method of claim 13 in which in step (a) the pressure applied to the fiber is controlled by the application of force to the pad elements urging them toward each other.

15. The method of claim 13 in which the surface of at least one of the pad elements contacting the fiber is conditioned so that varying pressure is applied to the fiber by the pad elements as the contacted area moves over the flaw for producing the frictional force for severing the fiber.

16. The method of claim 12 in which in step (a) the pad element is moved with respect to the fiber for moving the contacted area along the fiber over the flaw for severing the fiber.

17. The method of claim 13 in which in step (b) the fiber has a portion which is secured against movement and the pad elements are moved away from the fixed portion for moving the contacted area along the fiber over the flaw for severing the fiber.

18. The method of claim 17 in which in step (b) the fiber is moved with respect to the pad elements for continuously moving the contacted area of the fiber over the flaw for severing the fiber.

19. An optical fiber severing means comprising scoring means for inflicting a flaw on the glass surface of an optical glass fiber providing the fiber with first and second portions which are axially displaced and border the flaw on opposite sides, pressure means for slidably engaging and compressing the fiber by applying pressure to a contacted area about the fiber, and displaceable means for applying tension force between the first portion of the fiber and the pressure means and moving the fiber with respect to the pressure means so that its contacted area passes over the flaw as it moves along the surface of the fiber from its first portion to its second portion, the pressure means with the motion of the fiber producing frictional force at the contacted area along the surface of the fiber in a direction opposing the motion, the frictional force applied to the first portion of the fiber decreasing as the contacted area passes over the flaw while the frictional force applied to the second portion correspondingly increases in opposition to the tension force applied to the first portion of the fiber, until it is sufficient to sever the fiber at the flaw.

20. The fiber severing means of claim 19 in which the pressure means comprises a pad element for slidably engaging the contacted area of the fiber and applying pressure to the fiber.

21. The fiber severing means of claim 19 in which the pressure means comprises a pair of oppositely positioned pad elements for slidably receiving the fiber therebetween and applying pressure thereabout to the contacted area of the fiber.

22. The fiber severing means of claim 21 in which the pressure means includes biasing means for urging the pad elements toward each other and providing the pressure applied to the fiber by the pad elements for severing the fiber.

23. The fiber severing means of claim 21 in which at least one of the pad elements contacting the fiber is conditioned so that varying pressure is applied by the pad elements to the contacted area of the fiber as the contacted area moves over the flaw for producing frictional force for severing the fiber.

24. The fiber severing means of claim 19 which the scoring means comprising blade means for engaging the fiber to inflict a flaw comprising a defect on the glass surface of the fiber.

25. The fiber severing means of claim 20 in which the displaceable means includes means for moving the pad element along the fiber in the direction away from the first portion of the fiber so that the contacted area moves over the flaw for severing the fiber.

26. The fiber severing means of claim 21 in which the displaceable means includes clamping means for securing the first portion of the fiber and guide means for moving the pad elements with respect to the first portion of the fiber so that the contacted area moves over the flaw for severing the fiber.

27. The fiber severing means of claim 26 in which the displaceable means provides for continuously moving the pad elements over the flaw of the fiber in a direction away from the first portion for severing the fiber.

28. The fiber severing means of claim 27 in which the pressure means includes biasing means for urging the pad elements toward each other and providing the pressure which is applied to the fiber by the pad elements for severing the fiber.

29. Means for severing an optical glass fiber having a flaw inflicted on its glass surface to provide the fiber with first and second portions which are axially displaced and border the flaw on opposite sides comprising pressure means for slidably engaging and compressing the fiber by applying pressure to a contacted area about the fiber, and displaceable means for applying tension force between the first portion of the fiber and the pressure means and moving the fiber with respect to the pressure means so that its contacted area passes over the flaw as it moves along the surface of the fiber from its first portion to its second portion, the pressure means with the motion of the fiber producing frictional force at the contacted area along the surface of the fibeer in a direction opposing the motion, the frictional force applied to the first portion of the fiber decreasing as the contacted area passes over the flaw while the frictional force applied to the second portion correspondingly increases in opposition to the tension force applied to the first portion of the fiber, until it is sufficient to sever the fiber at the flaw.

30. The fiber severing means of claim 29 in which the pressure means comprises a pad element for slidably engaging the contacted area of the fiber and applying pressure to the fiber.

31. The fiber severing means of claim 29 in which the pressure means comprises a pair of oppositely positioned pad elements for slidably receiving the fiber therebetween and applying pressure thereabout to the contacted area of the fiber.

32. The fiber severing means of claim 31 in which the pressure means includes biasing means for urging the pad elements toward each other and providing the pressure applied to the fiber by the pad elements for severing the fiber.

33. The fiber severing means of claim 31 in which at least one of the pad elements contacting the fiber is conditioned so that arying pressure is applied by the pad elements to the contacted area of the fiber as the contacted area moves over the flaw for producing the frictional force for severing the fiber.

34. The fiber severing means of claim 30 in which the displaceable means includes means for moving the pad element along the fiber in the direction away from the first portion of the fiber so that the contacted area moves over the flaw for severing the fiber.

35. The fiber severing means of claim 31 in which the displaceable means includes clamping means for securing the first portion of the fiber and guide means for moving the pad elements with respect to the first portion of the fiber so that the contacted area moves over the flaw for severing the fiber.

36. The fiber severing means of claim 35 in which the displaceable means provides for continuously moving the pad elements over the flaw of the fiber in a direction away from the first portion for severing the fiber.

37. The fiber severing means of claim 36 in which the pressure means includes biasing means for urging the pad elements toward each other and providing the pressure which is applied to the fiber by the pad elements for severing the fiber.

38. The fiber severing means of claim 37 in which the guide means comprises a member which supports the pad elements in opposing relationship, and a portion which slidably engages the member and supports the clamping means for movement with respect to the pad elements.

* * * * *